March 29, 1932. C. I. HAYES 1,851,831
ATMOSPHERIC CONTROL FOR HEAT TREATING FURNACES
Filed Feb. 6, 1931
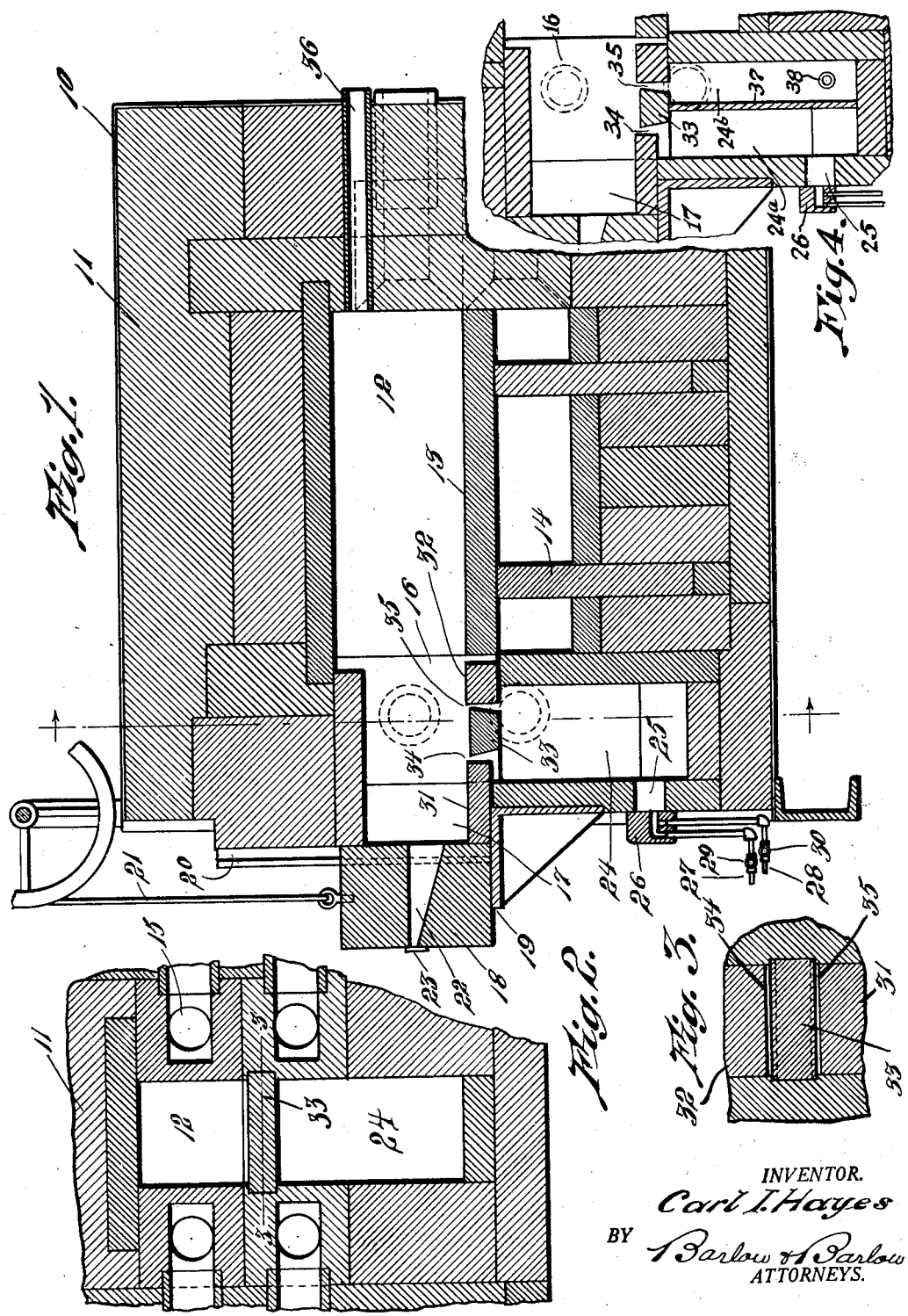
INVENTOR.
Carl I. Hayes
BY Barlow & Barlow
ATTORNEYS.

Patented Mar. 29, 1932

1,851,831

UNITED STATES PATENT OFFICE

CARL I. HAYES, OF PROVIDENCE, RHODE ISLAND

ATMOSPHERIC CONTROL FOR HEAT TREATING FURNACES

Application filed February 6, 1931. Serial No. 513,892.

My present invention relates to atmosphere control curtains such as disclosed in Patent No. 1,724,583, dated August 13, 1929, and has particular reference to improvements for more accurately controlling the atmospheric conditions within the furnace.

The art of heat treating high speed steels has heretofore utilized oil burning, gas burning, or electrically heated furnaces. As used commercially, the oil burning furnace and the gas burning furnace have either an oxidizing or a reducing atmosphere, depending on the regulation of the fuel supply to obtain the necessary heating temperature. The electrically heated furnace has an oxidizing atmosphere, on account of the presence of atmospheric air.

These furnaces have been found to affect the steel heat treatment, both for surface conditions and for grain growth. Various methods have therefore been devised to envelop the heat-treated material in either an inert atmosphere, or an atmosphere which is of definite predetermined constituency.

The use of a gas curtain of combusted gases, as disclosed in Hayes Patent No. 1,724,583, effectively excludes atmospheric oxygen during the heat treatment process; since the atmosphere within the heat treating chamber is dependent on both the volume and the constituency of the gases forming the curtain, it has been found that the position of the furnace mouth, the operating conditions, the ventilating conditions, and other similar factors, may affect the protecting curtain so as to slightly change its constituency, and therefore the constituency of the enveloping atmosphere.

Thus, if a very slight excess of CO is desirable for certain classes of high speed steels, the changes incident to fluctuating drafts of room air contacting with the curtain gases may vary this excess of CO in the enveloping atmosphere within the heat treating chamber. Since the excellence of the heat treatment, its uniformity, the lack of pitting, blistering, and the surface conditions of the treated steel depend on absolute uniformity of the enveloping atmosphere, it becomes desirable to devise an atmosphere control which will not be affected by changes incident to variations in operating room conditions. The principal object of my present invention is therefore to devise a control system which will maintain a uniform enveloping atmosphere within the heat treating chamber.

Further objects of my invention are to improve the distribution of the atmosphere excluding gases and the enveloping gases, and to prevent free burning of gases in the furnace mouth, when products of combustion are utilized as the atmosphere excluding bases.

With these and other objects and advantageous features in view, the invention consists of a novel method of operation and a novel combination of parts, more fully disclosed in the detailed description following, in conjunction with the accompanying drawings, and more particularly defined in the appended claims.

In the drawings:

Fig. 1 is a vertical section through a standard type electrical heating furnace;

Fig. 2 is a section on the line 2—2 of Figure 1, with parts broken away;

Fig. 3 is a fragmentary section on the line 3—3 of Figure 2; and

Fig. 4 is a fragmentary section showing a modified form of supply chamber for the enveloping and atmosphere excluding gases.

It has been found desirable to design a heat treating furnace with a treatment atmosphere control for establishing an enveloping atmosphere of definite constituency within the heat treating chamber, and with an air exclusion curtain for preventing entry of atmospheric air within the heat treating chamber. I have therefore devised a multiple curtain structure which utilizes one gas curtain for controlling the enveloping atmosphere within the heat treating chamber, and a second gas curtain for excluding atmospheric air from contacting with the first gas curtain. In this manner, I have provided a constant atmosphere for the heat treating chamber by preventing change in the atmospheric conditions therein. I have also improved the supply of curtain and enveloping gases by tapering the gas exits from the combustion chamber so as to guide the flame back into the combustion chamber. These structural features are disclosed in the detailed description following of a furnace construction which embodies the principles of my invention.

Referring to the drawings, the furnace casing 10 is of usual construction, and is lined with insulating blocks 11 of different sizes to provide a central heat treating chamber 12, a work receiving hearth 13 being supported within the chamber on the usual standards 14. The illustrated construction is of the closed chamber type, and may be heated in any desired manner; in the construction shown, the heat is obtained from a plurality of high temperature resistance bars 15 mounted in proximity to the walls of the heat treating chamber 12, suitable recesses in the furnace casing being provided for the necessary electrical contacts. The voltage is controlled by any standard type of rheostat, not shown. The heat treating chamber 12 has a throat opening 16 and a mouth 17 for entrance and removal of work; a door 18 of usual formation normally seats on the support shelf 19 to close the mouth 17, and is liftable upwardly within guide plates 20 by manual lifting mechanism 21 of any suitable construction to expose the mouth of the furnace. The door is equipped with the usual peep channel 22 closed by a metal cover 23, in order to permit inspection of the interior of the furnace when the door is in closed position.

A combustion chamber 24 is provided beneath the throat 16 with an inlet opening 25 which is normally closed by a supply member 26 receiving air and gas under pressure through pipes 27, 28, these pipes being preferably equipped with hand control valves 29, 30. The upper end of the combustion chamber is constricted as shown in Figure 1 by spaced throat plates 31 and 32 and an intermediate plate 33 which is tapered as shown and is suitably mounted to provide two spaced slots 34, 35 for controlling outlet of the combusted gases from the combustion chamber. The temperature within the heat treating chamber is measured by the usual pyrometer, inserted in the pyrometer bore 36.

When a mixture of air and gas of predetermined proportions and under pressure is admitted into the combustion chamber through the inlet opening 25, it may be ignited at either slot, and the flame immediately travels back because of the tapered formation of the slots to produce the desired combustion within the combustion chamber. The combusted gases emerge from the combustion chamber through both slots, the gases from the slot 35 being directed rearwardly to form a gaseous curtain which completely fills the heat treating chamber and eliminates all atmospheric air within two or three minutes to fill the heat treating chamber with an atmosphere of predetermined constituency.

The gases emerging from the slot 34 are directed forwardly to form an air excluding curtain across the mouth of the furnace, thus preventing access of atmospheric air to the gases forming the inner curtain. When heat treating high speed steels, the preferred enveloping atmosphere is one containing a small excess of CO, in the nature of one-half of one percent.

Analysis of the enveloping atmosphere as it functions under operating conditions, has indicated very unusual effects, which may be due to the high temperatures maintained in the heat treating chamber. Products of combustion as obtained from the combustion of gas and air include $N$, $CO_2$, and small amounts or traces of $CO$, $O_2$, $CH_4$, and $H$. The inner curtain of combusted gases slowly enters the heat treating chamber and displaces the gases therein, the changing operation being gradual and the entering gases being subjected to the high temperature in the heat treating chamber, which may run up to 2800° F., during the changing operation.

The combusted gases, under these conditions, seem to undergo a cracking action, and form a new mixture which is absolutely inert, and which cannot be exploded or burned with air. The formation and the retention of this inert mixture apparently depends on the uniformity of the combusted gases supplied to the heat treating chamber as enveloping gases.

The functioning of the multiple curtains is therefore clear. The inner curtain controls the atmosphere within the heat treating chamber, and the outer curtain protects the inner curtain, thus permitting a more absolute control of the atmosphere which envelops the work during the heat treatment.

Instead of using two curtains of combusted gases, it may be desirable to use a curtain of combusted gases or the like as the atmospheric air excluding medium and obtain the desired atmospheric conditions within the heat treating chamber by conducting a gas or gases of desired constituency and under pressure into the heat treating chamber. With this construction, it is possible to use an air excluding curtain of one gas, such as for example products of combustion, and a different gas or gases as the enveloping atmosphere, such as for example, nitrogen or the like. A preferred type of construction for accomplishing this purpose is shown in Fig. 4, which shows the combustion chamber 24a as reduced in width by utilizing a central partition 37, thus providing a second chamber 24b which may be supplied with gas for use as the work enveloping medium through a suitable inlet such as 38. The gas in the chamber 24b passes upwardly through the slot 35 to enter the heat treating chamber.

While I have described a specific furnace construction, it is obvious that desired changes in the dimensions of the furnace, of the heat treating chamber, and of the combustion chamber, and changes in the number of protecting curtains, in the slot formation, and the like, may be made, without departing from the spirit and the scope of the invention as defined in the appended claims.

I claim:

1. A method of operating a heat treating furnace, including the steps of enveloping work to be heat treated in a gaseous medium, and interposing an additional quantity of the same gaseous medium between said first gaseous medium and the outside atmosphere to exclude atmospheric air from contacting said first gaseous medium.

2. A method of operating a heat treating furnace, including the steps of enveloping work to be heat treated in combusted gases, and interposing additional combusted gases between said enveloping combusted gases and the outside atmosphere to exclude atmospheric air from contacting said enveloping combusted gases.

3. In a heat treatment furnace, a heat treatment chamber, means for supplying gas under pressure to said chamber to fill said chamber, and additional means for interposing a gaseous curtain between said first gas and atmospheric air to exclude atmospheric air therefrom.

4. In a heat treatment furnace, a heat treatment chamber, means for supplying combusted gases under pressure to said chamber to fill said chamber, and additional means for interposing a curtain of combusted gases between said first gas and atmospheric air to exclude said atmospheric air therefrom.

5. In a heat treatment furnace, a heat treatment chamber having a mouth, means for supplying gas under pressure to said chamber to fill said chamber, and additional means for projecting additional gas under pressure across said mouth to form an air excluding curtain therefor.

6. In a heat treatment furnace, a heat treatment chamber having a mouth, means for supplying gas under pressure to said chamber to fill said chamber, a combustion chamber, and additional means for projecting combustion products from said chamber across said mouth to form an air excluding curtain therefor.

7. In a heat treatment furnace, a heat treatment chamber having a mouth, a combustion chamber, means for supplying products of combustion under pressure to said chamber to fill said chamber, and means for projecting additional products of combustion under pressure in a separate stream across said mouth to form an air excluding curtain therefor.

8. In a heat treatment furnace, a heat treatment chamber having a throat and a mouth, a combustion chamber, and spaced openings in the floor of said throat in communication with said combustion chamber, at least one of said openings comprising a slot extending completely across the floor of said throat.

9. In a heat treatment furnace, a heat treatment chamber having a throat and a mouth, a combustion chamber, and spaced openings in the floor of said throat in communication with said combustion chamber, each of said openings comprising a slot extending across the floor of said throat completely.

10. In a heat treatment furnace, a heat treatment chamber having a throat and a mouth, a combustion chamber, and spaced openings in the floor of said throat in communication with said combustion chamber, at least one of said openings comprising a slot extending completely across the floor of said throat, said slot widening as it recedes from said throat.

11. In a heat treatment furnace, a heat treatment chamber having a throat and a mouth, a combustion chamber, and spaced openings in the floor of said throat in communication with said combustion chamber, each of said openings comprising a slot extending completely across the floor of said throat, each slot widening as it recedes from said throat.

12. A method of operating a heat treating furnace, including the steps of utilizing a gaseous medium as an enveloping medium for work to be heat treated, utilizing an additional quantity of the same gaseous medium to exclude atmospheric air from contacting said first gaseous medium, and subjecting the work to be heat treated and the enveloping medium to regulated heat.

13. A method of operating a heat treating furnace, including the steps of utilizing combusted gases as an enveloping medium for work to be heat treated, utilizing additional combusted gases to exclude atmospheric air from contacting said first gaseous medium, and subjecting the work to be heat treated and the enveloping medium to regulated heat.

14. A method of operating a heat treating furnace, including the steps of enveloping work to be heat treated in a gaseous medium, and interposing a gaseous curtain between the work enveloping medium and the outside atmosphere to exclude atmospheric air from contacting said work enveloping medium.

In testimony whereof I affix my signature.

CARL I. HAYES.